June 22, 1926.
A. C. HOUGLAND
STRAINER FAUCET FOR CHURNS
Filed March 5, 1923
1,589,884
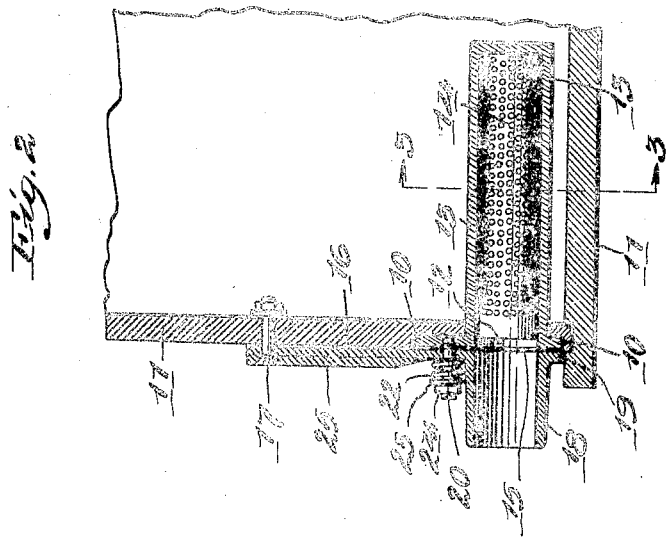
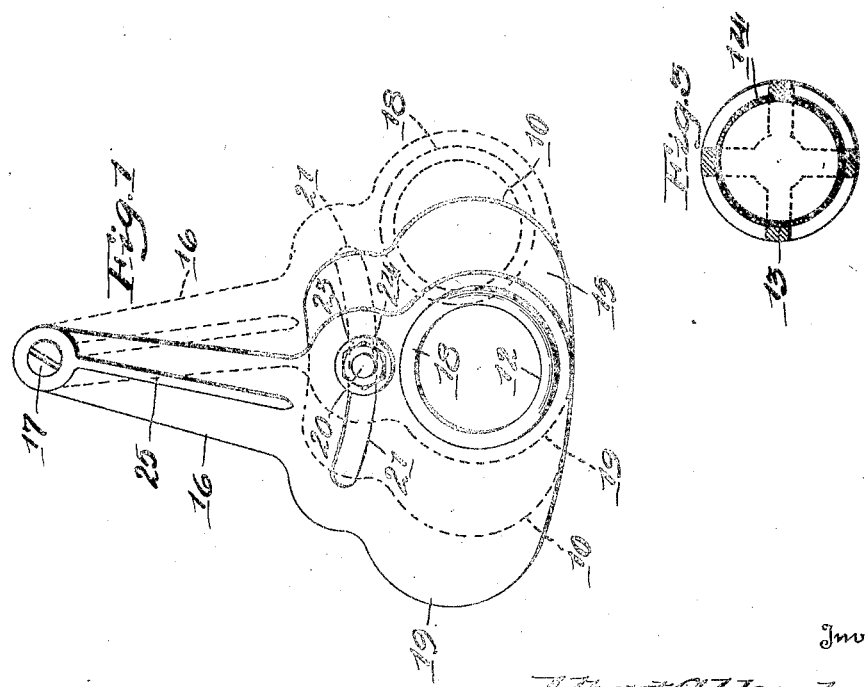
Inventor
Albert C. Hougland,
By John E. Stryker
his Attorney Patented June 22, 1926.

1,589,884

UNITED STATES PATENT OFFICE.

ALBERT C. HOUGLAND, OF ST. PAUL, MINNESOTA, ASSIGNOR TO CRANE COMPANY OF MINNESOTA, A CORPORATION OF MINNESOTA.

STRAINER FAUCET FOR CHURNS.

Application filed March 5, 1923. Serial No. 623,076.

It is the object of this invention to effect a saving of butter and increase the efficiency of a churn by providing a combined strainer and faucet of novel and efficient construction, so that butter milk and wash water may be quickly and easily withdrawn from the churn while retaining therein valuable particles of butter fat which would otherwise go to waste.

A further object of this invention is to provide a faucet of this kind with unusually efficient means for preventing leakage.

Another object is to provide such a faucet with a strainer so arranged that it may be either quickly replaced by another strainer or removed for cleaning.

Referring to the accompanying drawings which illustrate the best form of my device at present known to me, Figure 1 is an elevation of my improved strainer faucet; Fig. 2 is a central vertical section of the same, together with the adjacent portions of a churn upon which the device is mounted and Fig. 3 is a section through the strainer and support taken on the line 3—3 of Fig. 2.

As illustrated, a plate 10, adapted to be counter sunk in the outer surface of a churn 11, is formed with an outlet aperture 12. Projecting inward from the plate 10, adjacent to the aperture 12, is a grid support 13 for a cylindrical strainer 14. This strainer 14 is removably held within the churn 11 by the support 13. The outer face of the plate 10 is covered, as clearly shown in Fig. 2, by a gasket 15, preferably made of soft metal such as lead.

An arm 16 is pivotally secured to the churn 11 by a bolt 17, the lower or movable end of said arm being slidable upon the gasket 15 and across the aperture 12. This lower end of the arm 16 is provided with an outlet conduit 18, which is adapted to register with the aperture 12 when it is desired to withdraw liquid from the churn, and said arm is also formed with a flange 19 arranged to close the aperture 12. Threaded in the plate 10, above the conduit 18, is a stud bolt 20 which projects through an arcuate slot 21 in the flange 19. A coiled spring 22 is held under compression between the outer face of the arm 16 and a washer 23 by a nut 24 on the projecting end of the bolt 20. The abutting faces of the gasket 15 and the flange 19 are smooth plane surfaces so that the spring 22 prevents leakage between said surfaces, but allows movement of the arm 16 carrying the flange 19 and conduit 18. The arm 16 is strengthened by a central rib 25 extending downward from the bolt 17.

In use, the conduit 18 may be fitted with a hose to deliver the butter milk or water from the faucet to the desired place of disposal. During the operations of churning or working butter, the faucet is moved to closed position, viz, the dotted line position shown in Fig. 1, by moving the arm 16 so as to bring the flange 19 over the aperture 12. In this position of the arm 16, the bolt 20 is in contact with the left end of the slot 21, as shown in Fig. 1. To withdraw liquid from the churn, the arm 16 carrying the outlet conduit 18 is merely moved to the full line position, shown in Fig. 1, when said conduit will register with the aperture 12. Butter milk or water will now pass between the grid bars of the support 13, through the strainer 14 and out through the conduit 18. When, as frequently occurs, the strainer 14 becomes clogged, it may be easily removed by withdrawing it through the aperture 12 and conduit 18. The strainer may now be cleaned and replaced, or another strainer substituted therefor without substantial interruption of the churning.

Having described my invention what I claim as new and desire to protect by Letters Patent is:

In a faucet for a cylindrical churn having an inset end and an outlet aperture in said end in close proximity to the inner periphery of the churn, an arm, a pivotal support for one end of said arm on the churn, a conduit disposed on the other end of said arm to register with said aperture, a flange adjacent to said conduit adapted to close said aperture, said flange being formed with an arcuate slot located between said conduit and pivotal support, a bolt secured to the churn and projecting through said slot in alignment with said aperture and with the pivotal support for said arm, and means on the projecting end of said bolt adapted to maintain said flange in frictional engagement with the churn near said aperture.

In testimony whereof, I have hereunto signed my name to this specification.

ALBERT C. HOUGLAND.